Figure 1:
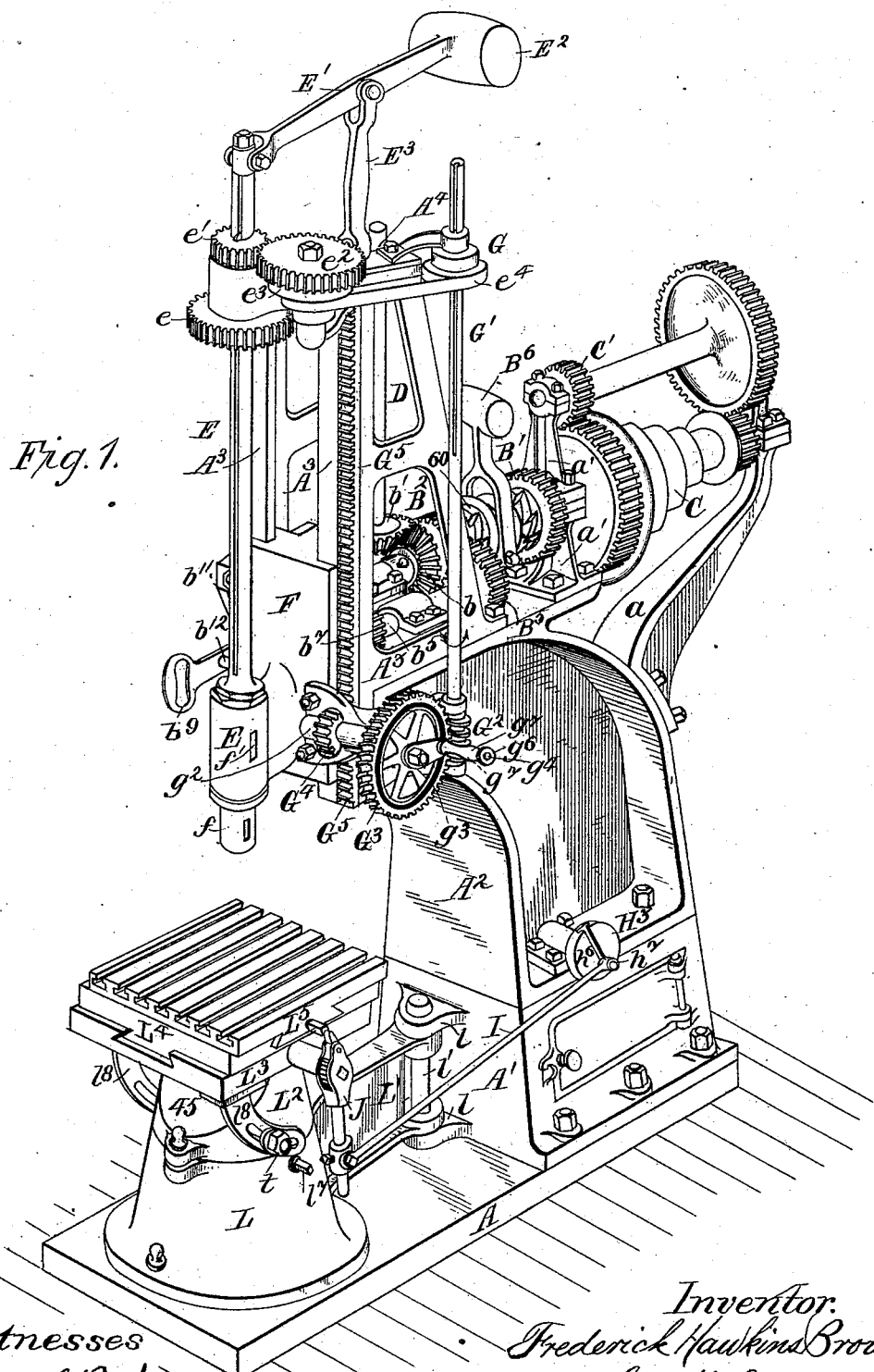

(No Model.) 4 Sheets—Sheet 1.
F. H. BROWN.
CONVERTIBLE MACHINE FOR SLOTTING OR DRILLING.
No. 367,782. Patented Aug. 9, 1887.

Witnesses
Saml. B. Dover
Thomas Charlton

Inventor:
Frederick Hawkins Brown,
By Geo. W. Lepin.
Attorney.

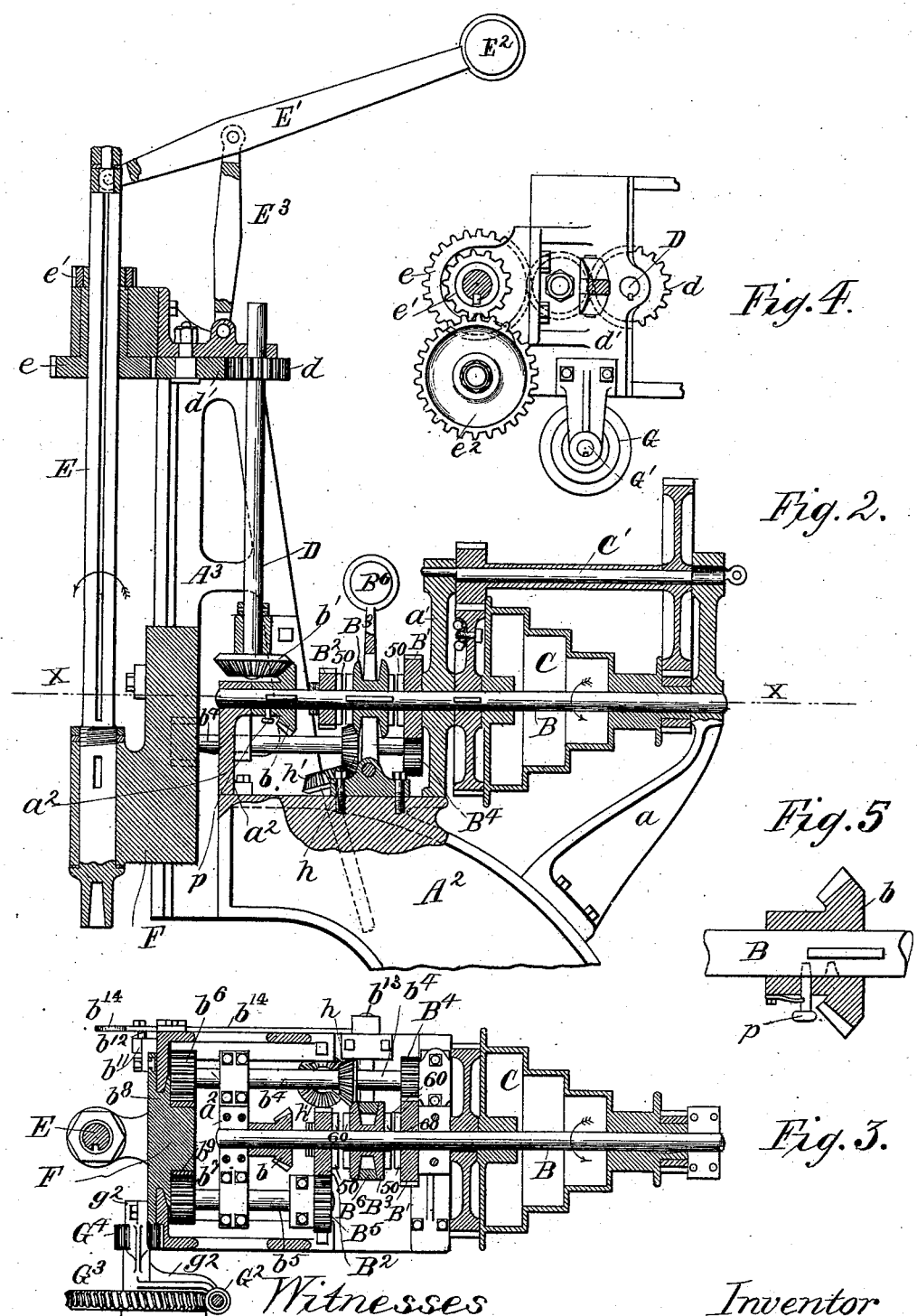

(No Model.) 4 Sheets—Sheet 3.
F. H. BROWN.
CONVERTIBLE MACHINE FOR SLOTTING OR DRILLING.
No. 367,782. Patented Aug. 9, 1887.
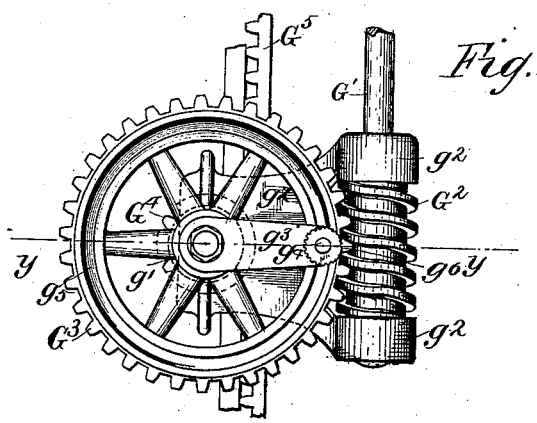
Fig. 6.
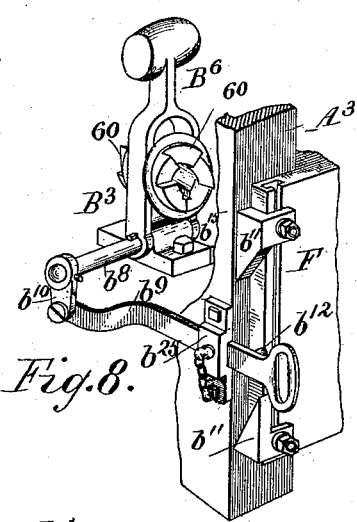
Fig. 8.
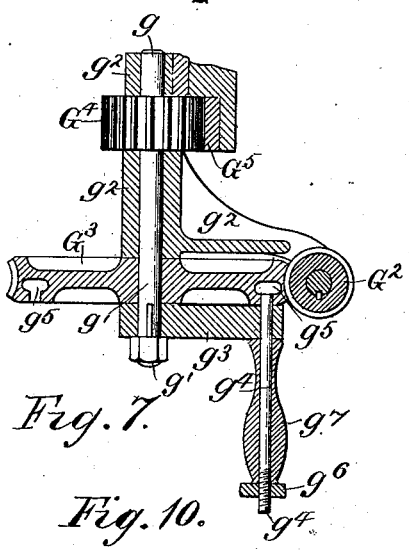
Fig. 7.
Fig. 10.
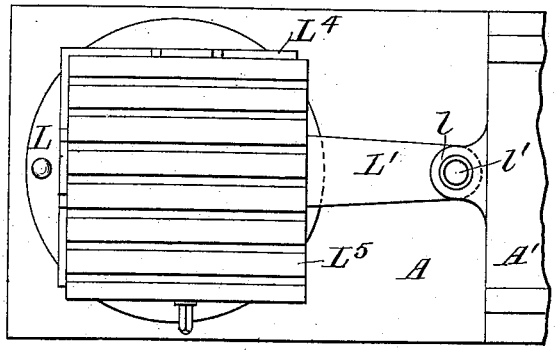
Fig. 9.
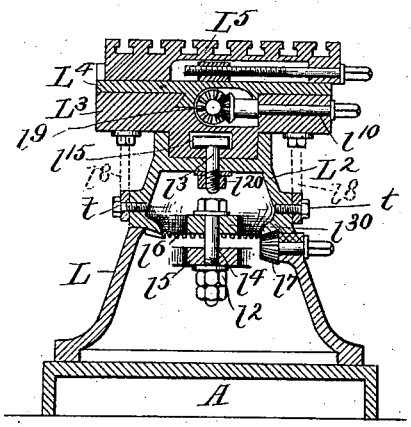
Fig. 11.
Witnesses
Saml. B. Dover.
Thomas Chaillou
Inventor:
Frederick Hawkins Brown,
By Geo. W. Lepin.
Attorney.
N. PETERS, Photo-Lithographer, Washington, D. C.

(No Model.)
F. H. BROWN.
CONVERTIBLE MACHINE FOR SLOTTING OR DRILLING.
No. 367,782. Patented Aug. 9, 1887.
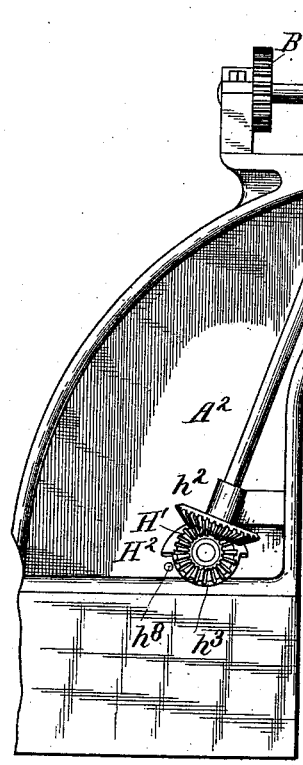
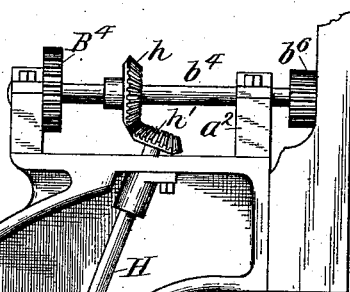
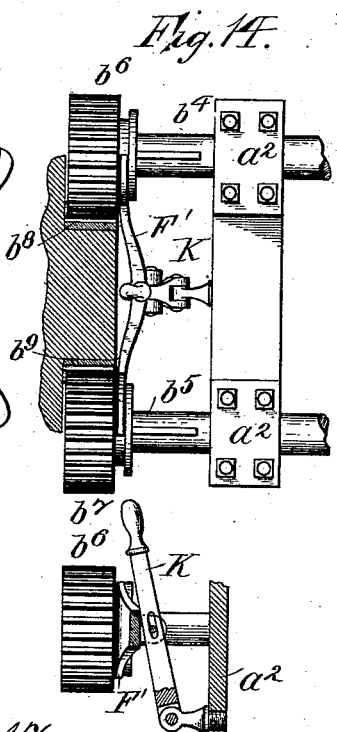
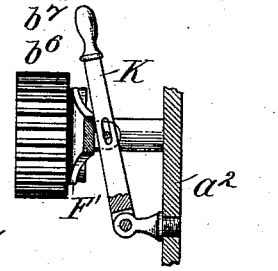
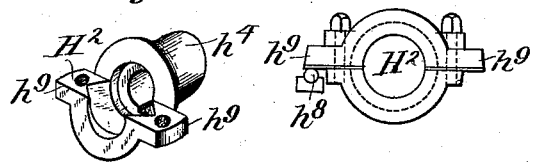
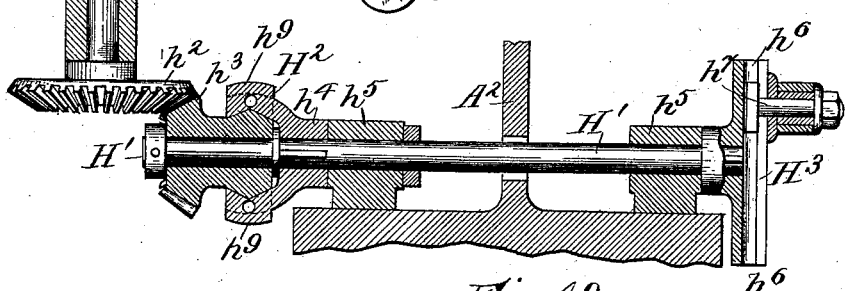
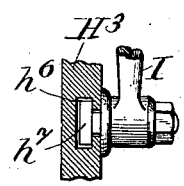
Witnesses
Saml. B. Dover.
Thomas Charlton
Inventor.
Frederick Hawkins Brown
By Geo. W. Lefin,
Atty.

UNITED STATES PATENT OFFICE.

FREDERICK HAWKINS BROWN, OF CHICAGO, ILLINOIS.

CONVERTIBLE MACHINE FOR SLOTTING OR DRILLING.

SPECIFICATION forming part of Letters Patent No. 367,782, dated August 9, 1887.

Application filed March 19, 1886. Serial No. 195,805. (No model.)

*To all whom it may concern:*

Be it known that I, FREDERICK HAWKINS BROWN, a citizen of the United States, residing at Chicago, in the county of Cook and State of Illinois, have invented certain new and useful Improvements in Convertible Machines for Slotting or Drilling, of which the following is a full, clear, and exact description, reference being had to the accompanying drawings, and to the letters of reference marked thereon, which form a part of this specification.

My invention relates particularly to convertible machines for slotting or drilling, which, at the pleasure of the operator, may be distinctively employed for either one of such purposes, and to the construction, arrangement, and operation of the platen sustaining and operating mechanism forming a part of such convertible machine or other drilling or slotting machine; also, to mechanism for communicating the necessary reciprocating motion to the cross-head or equivalent cutter-tool carrying part of a slotting or other planing-machine; and it consists, as will further appear, in the matters hereinafter set forth, and pointed out in the appended claims.

To comprehensively illustrate the several features of my invention, I have shown in the accompanying drawings, Figure 1, a perspective view of a convertible machine for slotting or drilling; Fig. 2, a central sectional detail of the upper part thereof; Fig. 3, a cross-sectional detail taken on the line $x$ $x$ of said Fig. 2; Fig. 4, a plan detail, partly in section, showing the arrangement of the gears which communicate motion to the drill-spindle and the cone through which motion is imparted to the worm-shaft which forms a part of the vertical feed mechanism for said spindle; Fig. 5, a detail showing the arrangement and operation of the means employed for holding the main spindle of the machine in or out of operative engagement with the mechanism which operates the drill-spindle; Fig. 6, a side detail, further showing the mechanism employed for vertically feeding the drill-spindle; Fig. 7, a transverse sectional detail taken on the line $y$ $y$ of said Fig. 6; Fig. 8, a perspective detail showing the arrangement of the mechanism which operates automatically to bring about a reciprocating action of the cross-head or equivalent slide-bearing F; Figs. 9, 10, 11, details showing the arrangement of the platen, together with the mechanism sustaining and operating the same; Fig. 12, a side detail showing the manner in which motion is communicated from the main spindle of the machine to the mechanism which operates the platen and the several parts sustaining and operating the same; Figs. 13, 14, 15, details showing an arrangement of mechanism which may be employed for carrying beyond engagement therewith, when desired, the pinions which mesh with racks formed on the cross-head or slide-bearing F, and through which a reciprocating motion is given to said cross head or slide-bearing; Figs. 16, 17, 18, 19, details showing the arrangement of certain of the mechanism through which motion is communicated from the main spindle of the machine to the feed-ratchet which operates the platen and its sustaining devices.

A A' A$^2$ A$^3$ A$^4$ indicate, respectively, the bed-plate, main frame, and upper cap of the machine, the portion A$^2$ being provided with brackets $a$ $a'$ $a^2$, which form bearings for the main spindle B, back gear-spindle, C', and auxiliary spindles $b^4$ $b^5$.

$b$ represents a longitudinally-adjustable miter or bevel gear held to the main spindle B in engagement with a corresponding gear, $b'$, fixed to the lower end of the vertical spindle D, which carries at or near its upper end a gear-wheel, $d$, by which motion is communicated through the intermediate gear, $d'$, to the gear $e$, which rotatively operates the drill-spindle E, (which journals near its lower end in a projecting portion of the cross-head F,) motion being thence imparted through the pinion $e'$ to the gear $e^2$, fixed to the cone $e^3$, which, by means of the belt $e^4$, puts in rotation the cone G, which operates the feed or worm shaft G', and therefore the worm-wheel G$^3$, working on the spindle $g'$, which spindle, together with said feed-shaft G', is sustained by the bracket $g^2$, which is fixed to the cross-head F. To said spindle $g'$ is fixed the pinion G$^4$, which meshes with the rack G$^5$, formed upon the outer face of the section A$^3$ of the main frame. To the outer end of said spindle $g'$ is keyed or otherwise rigidly fixed the crank $g^3$, having a hollow handle, $g^7$, through which passes a bolt, $g^4$, provided at one end with a V or other suitably formed head, for effective locking operation, in conjunction with a corresponding annular groove, $g^5$, formed in the said worm-wheel $G^2$, and at the other end with a screw-thread and tightening-nut, $g^6$.

$E'$ $E^2$ $E^3$ indicate the ordinary counterbalancing mechanism which is applied to the drill-spindle of an upright drill.

Upon the main spindle B are located idler-gears $B'$ $B^2$, (particularly shown in Figs. 2 and 3,) which are held laterally in position by collars or other suitable appliances, and provided on their inner faces, each, with a ratchet, 50, which is intended to engage for operative purposes with a similar ratchet, 60, formed on the corresponding face of the sliding double clutch $B^3$, which is likewise carried by said main spindle. Fixed to spindles $b^4$ $b^5$, which are sustained on either side of said main spindle by suitable bearings provided therefor, are gear-wheels $B^4$ $B^5$, which mesh, respectively, with said ratcheted idler-gears $B'$ $B^2$, carried by said main spindle, said spindles $b^4$ $b^5$ also carrying pinions $b^6$ $b^7$, which mesh with corresponding racks, $b^8$ $b^9$, formed on the sides of the cross-head F, contiguous to the rear face thereof. The double clutch $B^3$, working upon a feather, preferably forming a part of said main spindle B, is thrown in and out of engagement with said ratcheted gears $B'$ $B^2$, consecutively, by means of a weighted yoke-shaped lever or arm, $B^6$, (particularly shown in Fig. 8,) which, working in a circumferential groove provided in said double clutch, is fixed at its lower end to the shaft $b^{13}$, which journals in a bearing, $b^{15}$, fixed to or forming a part of the portion $A^2$ of the main frame, said shaft, and therefore said weighted lever or arm, by means of the tripping-bar $b^{14}$, which is connected through the arm $b^{10}$ with said shaft $b^{13}$, being operated by suitably-formed blocks $b^{11}$, adjustably fixed to the cross-head F, which engage with the projecting lug or roll $b^{12}$, which forms a part of said tripping-bar. A locking device, $b^{25}$, preferably consisting of a pin which passes through said tripping-bar into the frame of the machine, is provided for holding the tripping-bar in such fixed position when it is desired to operate the machine for drilling purposes as will prevent the clutch $B^3$ from sliding upon its spindle and from engaging with the gears $B'$ $B^2$, at such time the engaging-blocks $b^{11}$ being removed from the cross-head or beyond the possibility of engagement with the tripping-bar.

The standard or base-section L of the platen-sustaining mechanism has a hinged connection with the section $A'$ of the main frame by means of the extension or arm $L'$, lugs $l$, projecting from said main frame, and the bolt $l'$, such hinged arrangement being provided for the purpose of enabling the swinging of the platen and its sustaining mechanism out of the way when desired. Above said base-section L, and sustained thereby, is a section, $L^2$, rotatably held to said base-section by means of a bolt, $l'$, which, passing through the transverse bridges $l^{10}$ $l^3$ of said sections L $L^2$, is locked in position by the plate and nuts $l^2$, the lower portion of said section $L^2$, which is embraced within the section L, being provided with a circular rack, $l^6$, which meshes with a bevel-pinion, $l^7$, the spindle or stem of which journals in a bearing provided therefor in said section L. Above said section $L^2$, and journaling in the half-circular bearing forming a part thereof, is located the swinging table $L^3$, held to said section $L^2$ by the bolt $l^8$, the T-head of which is seated in a suitable recess, $l^{15}$, formed in the journaling portion of said table $L^3$, said bolt being locked in its proper position by a plate and nut, $l^{20}$. To the under surface of said swinging table $L^3$ are bolted slotted adjusting-quadrants $l^8$, which are held to the section $L^2$ (particularly shown in Figs. 10 and 11) by bolts $t$, the portion 45 of said section $L^2$ which is between said quadrants having such configuration as will enable the table $L^3$ to be tilted and held by means of said quadrants at any desired angle within the range of adjustment of which such arrangement is capable. Above said swinging table $L^3$, and sustained thereby, is located the slide $L^4$, which is operated by means of the ordinarily-employed screw and threaded lug, motion being given to said screw by the miter-gear $l^9$, fixed to the spindle or stem thereof, through the corresponding miter-gear, $l^{10}$, fixed to the spindle which journals in said table $L^3$ and projects outwardly therefrom. Above said slide $L^4$, and sustained thereby, is located the sliding platen $L^5$, which is traversed at a right angle to the travel of the slide $L^4$ by means of the ordinarily-employed screw and threaded lug or nut, as shown.

To the spindle $b^4$, (particularly shown in Fig. 12,) carrying the pinion $b^6$ and gear $B^4$, which latter is operated by the ratcheted gear $B'$, carried by the main spindle B, is keyed a bevel or miter gear, $h$, which meshes with a corresponding gear, $h'$, fixed to the upper end of the downwardly-inclined shaft H, which is sustained by bearings bolted to or forming a part of the portion $A^2$ of the main frame, the lower end of said shaft carrying a bevel or miter gear, $h^2$, which meshes with a corresponding friction-gear, $h^3$, rotatably adjusted to the shaft $H'$, (see Fig. 18,) which is located transversely of the portion $A^2$ of the main frame and sustained in suitable bearings, $h^5$, provided therefor, the hub of said friction-gear having a V or other desirable outer configuration for proper frictional contact with the friction-clamp $H^2$, which is keyed by means of its hub $h^4$ to said shaft $H'$. To the opposite end of said shaft $H'$ is keyed or otherwise fixed the disk $H^3$, provided with a diametrical T-groove, $h^6$, in which works a T-headed wrist-pin, $h^7$, obviously adjustable, carrying the rod I, which is intended to operate the various feeds of which the platen and its sustaining mechanism is capable. The projecting portions $h^9$ of the friction-clamp $H^2$ are engaged, when in operation, by a stop lug or point, $h^8$, (see Figs. 12 and 17,) which interrupts the rotation thereof, and therefore the rotation of the spindle or shaft H' and the disk $H^3$, which operates the feed-ratchet J through the connecting-rod I.

In Fig. 5 is particularly illustrated the preferable adjustable arrangement of the miter or bevel gear $b$, which is carried upon a feather by the main spindle B, and through which motion is communicated to the drill-spindle.

When it is desired to operate the machine for slotting purposes, it becomes necessary to remove and hold said gear beyond operative engagement with the gear $b'$, which is done by withdrawing the spring-pin $p$, which is shown passing through the hub of said gear $b$, from its seat in the spindle and carrying the gear rearwardly on its spindle beyond meshing contact with the gear $b'$, at which time the pin enters another seat provided therefor in the spindle, locking the gear in the desired position.

In Figs. 13 and 14 is shown a convenient means which may be employed, if desired, for withdrawing the pinions $b^6$ $b^7$, carried by the spindles $b^4$ $b^5$, from engagement with the racks $b^8$ $b^9$, formed on the cross-head. A double yoke, F', working in suitable grooves formed in the hubs of said pinions, is pivotally connected with a lever, K, which is hinged to or near the bracket $a^2$, fixed to the portion $A^2$ of the main frame. Said pinions, being feathered upon their spindles, are carried rearwardly thereon beyond engagement with said racks by a rearward movement of said lever, which may be held in such position by any convenient hooking or securing device suitable for such purpose.

The operation of the machine for drilling purposes is substantially similar to the operation of any ordinary upright drilling-machine. Its operation for slotting purposes is as follows: The adjustable gear $b$ on the main spindle B, being located in position beyond engagement with the gear $b'$, the locking strain of the nut $g^6$ on the bolt $g^4$, which works through the crank-handle $g^7$ of the drill-spindle feed mechanisms, being relieved, the tripping-bar engaging-blocks $b^{11}$ being properly adjusted to the cross-head F, the locking-pin $b^{25}$ being withdrawn from the tripping-bar, the drill-spindle being fixedly held to the projecting portion of the cross-head, which forms its lower bearing, by means, preferably, of a key passing through said bearing at the point $f'$ and through said spindle, and the slotting-tool being adjusted preferably to the drill-socket $f$ of said drill-spindle, the main spindle B is put in revolution. The ratcheted idler-gears B' $B^2$ on the main spindle B are both driven in the direction of rotation of the driving-cone C by the sliding clutch $B^3$, as said gears are alternately engaged thereby. The tripping-bar $b^{14}$ may primarily be drawn outwardly, so that the clutch is thrown by the weighted lever B into engagement with the gear B', which puts in revolution the gear $B^4$, fixed to the spindle $b^4$, which carries the pinion $b^6$. The pinion $b^6$, being rotated upwardly with relation to its engagement with the rack $b^8$, feeds the cross-head upwardly until the incline of the lower block $b^{11}$ engages with the tripping-bar and forces the same inwardly, thereby sliding the clutch upon its spindle B to engagement with the gear $B^2$, which, engaging with the gear $B^5$, fixed to the spindle $b^5$, operates the pinion $b^7$, which, rotating downwardly with relation to its engagement with the rack $b^9$, reverses the direction of travel of the cross-head, which continues to travel downwardly until the tripping-bar is engaged and forced outwardly by the incline of the upper block $b^{11}$ which obviously again reverses the motion of the cross-head, which continues to be thus reciprocated, and with such length of stroke as may be desirably determined by the adjustment of the engaging-blocks $b^{11}$.

For ordinary slotting-work the platen $L^5$, with the work clamped thereto, and the lower slide, $L^4$, are operated from or in the position shown in Fig. 1; but if it is desired that such work should be done at an angle, the table $L^3$ is adjusted to the necessary angularity by means of the quadrants $l^8$ and bolts $t$, the traversing feeds in either instance being operated by hand, or automatically through the ratchet J and its connected and actuating devices, as may be desired.

If circular cutting at an angle or otherwise should be desired, the platen is adjusted to the proper angle or otherwise, as shown in said Fig. 1, and the circular feed operated by hand or automatically, if preferred, by means of the ratchet J and its connected and actuating devices. The adjustments of which the platen is capable also enables the drilling of holes at any desired angle, which is manifestly a very valuable feature of my invention.

Recurring to the operation of the several elements forming the feed-ratchet-actuating mechanism, the miter or bevel gear $h$, fixed to the spindle $b^4$, having a variable direction of rotation, as the gear $B^4$ and pinion $b^6$ are actuated by the gear B' and rack $b^8$, and such variable motion being communicated through the gear $h'$, shaft H, and gear $h^2$ to the friction-gear $h^3$, the friction-clamp $H^2$ is caused, through the employment co-operatively therewith, of a stop, $h^8$, to regulate the length of rotative stroke of the disk $H^3$, regardless of the travel of the friction-gear $h^3$, which might be greater than the length of stroke desired to be given to the disk.

It is apparent that contiguous drilling and slotting work may be done in many instances in my machine without changing the position of the work upon the platen after the same has been once bolted thereto.

It is obvious that many modifications of the details of the machine herewith illustrated may be made without departing from the spirit of my invention, which is not restricted to the exact construction shown. Thus the sliding clutch $B^3$ and the gears $B'$ $B^2$ on the main spindle B may be arranged to engage through frictional contact instead of through the ratchets 50 60 shown, which, and like obvious changes of construction or arrangement, are deemed to be within the scope of my invention and the intent of the appended claims.

Having fully described my invention, what I claim as new, and desire to secure by Letters Patent, is—

1. The combination, with the cross head or slide-bearing F, provided with racks $b^8$ $b^9$, pinions $b^6$ $b^7$, which mesh, respectively, with said racks, a sliding clutch, $B^3$, carried by the main spindle B, and a system of gearing through which motion is communicated from said clutch to said pinions, whereby a reciprocating motion is given to said cross-head or slide-bearing, of the drill-spindle E, sustained by said cross-head or slide-bearing, and devices for rotatively operating the same, the whole being arranged and adapted to be operated either as a slotting-machine or a drilling-machine, substantially as described.

2. The combination of a suitably-sustained cross-head or slide-bearing, F, provided with racks $b^8$ $b^9$, pinions $b^6$ $b^7$, and gear-wheels $B^4$ $B^5$, carried by spindles $b^4$ $b^5$, a sliding clutch, $B^3$, and idler-gears $B'$ $B^2$, carried by a spindle, B, and devices for automatically carrying said clutch into alternate engagement with said idler-gears, all arranged substantially as described, and adapted to reciprocate said cross-head or slide-bearing, as set forth.

3. The combination, with a main standard, L, of a rotatable section, $L^2$, swinging table $L^3$, and slides $L^4$ $L^5$, substantially as and for the purpose described.

FREDERICK HAWKINS BROWN.

Witnesses:
GEO. W. LEVIN,
SAML. B. DOVER.